(12) United States Patent
Yan et al.

(10) Patent No.: US 10,589,485 B2
(45) Date of Patent: Mar. 17, 2020

(54) PRESSURIZED HEAT-PRESS APPARATUSES AND ASSOCIATED METHODS

(71) Applicant: Citta International LLC, Bellevue, WA (US)

(72) Inventors: Jun Yan, Shenzhen (CN); Bo Li, Basking Ridge, NJ (US)

(73) Assignee: Boenn Technologies Inc., Bellevue, WA (US)

( * ) Notice: Subject to any disclaimer, the term of this patent is extended or adjusted under 35 U.S.C. 154(b) by 406 days.

(21) Appl. No.: 15/449,516

(22) Filed: Mar. 3, 2017

(65) Prior Publication Data

US 2018/0250903 A1  Sep. 6, 2018

(51) Int. Cl.
| | | |
|---|---|---|
| *B30B 1/32* | (2006.01) | |
| *B30B 15/06* | (2006.01) | |
| *B30B 15/22* | (2006.01) | |
| *B30B 15/00* | (2006.01) | |
| *B30B 15/16* | (2006.01) | |
| *F16P 1/02* | (2006.01) | |
| *F16P 3/22* | (2006.01) | |
| *B30B 1/08* | (2006.01) | |
| *B30B 15/34* | (2006.01) | |

(52) U.S. Cl.
CPC ............... *B30B 1/32* (2013.01); *B30B 1/08* (2013.01); *B30B 15/0052* (2013.01); *B30B 15/064* (2013.01); *B30B 15/22* (2013.01); *B30B 15/34* (2013.01); *F16P 1/02* (2013.01); *F16P 3/22* (2013.01)

(58) Field of Classification Search
CPC ......... B30B 15/064; B30B 15/34; B30B 1/04; B30B 1/02; B30B 1/12; B30B 15/00; B30B 15/16; B30B 15/06; B30B 15/22; B30B 1/08; B30B 1/32; B41F 16/02; B41F 1/38; F16P 1/02; F16P 3/22
USPC .... 100/92, 325, 326, 280, 281, 283, 269.11, 100/269.13, 315, 341, 344
See application file for complete search history.

(56) References Cited

U.S. PATENT DOCUMENTS

| | | | | |
|---|---|---|---|---|
| 2,600,242 A | * | 6/1952 | May ........................ | B30B 1/06 100/231 |
| 3,130,761 A | * | 4/1964 | Fleming ................... | B27D 3/00 144/254 |
| 3,186,334 A | | 6/1965 | Brown | |
| 3,272,114 A | * | 9/1966 | Rakel ..................... | A41H 43/04 100/349 |

(Continued)

*Primary Examiner* — Jimmy T Nguyen
(74) *Attorney, Agent, or Firm* — Perkins Coie LLP (57) ABSTRACT

Apparatuses for pressing and heating a material and associated methods are disclosed herein. An apparatus of the present technology includes a housing, a pressure component positioned in the housing, a linkage component coupled to the pressure component, a first heating component coupled to the linkage component, and a second heating component positioned adjacent to the first heating component. The linkage component is movable between a first position and a second position. When the linkage component is at the first position, the linkage component is positioned at a first level. When the linkage component is at the second position, the linkage component is positioned at a second level and the linkage component holds the first heating component stationary relative to the second heating component.

20 Claims, 6 Drawing Sheets

(56) References Cited

U.S. PATENT DOCUMENTS

| | | | | |
|---|---|---|---|---|
| 4,329,865 A | * | 5/1982 | Meinholdt | B21D 5/029 72/389.4 |
| 4,420,964 A | * | 12/1983 | Petrov | B21D 28/002 100/265 |
| 5,060,566 A | * | 10/1991 | Ihara | B30B 1/16 100/272 |
| 5,147,496 A | * | 9/1992 | Hix | B30B 1/12 100/283 |
| 5,435,883 A | | 7/1995 | Myers | |
| 5,817,210 A | | 10/1998 | Morin | |
| 6,058,834 A | | 5/2000 | Beckwith | |
| 6,742,448 B1 | * | 6/2004 | Davis | B30B 9/3007 100/229 A |
| 6,772,681 B1 | | 8/2004 | Raio et al. | |
| 7,080,534 B2 | * | 7/2006 | Schneiderheinze | F16P 3/144 100/342 |
| 7,836,746 B2 | * | 11/2010 | Ericson | B21D 26/025 100/271 |
| 2007/0089618 A1 | | 4/2007 | Robinson et al. | |
| 2008/0196836 A1 | * | 8/2008 | Woods | B30B 1/12 156/367 |
| 2009/0000496 A1 | | 1/2009 | Shahriari | |
| 2018/0250902 A1 | | 9/2018 | Yan et al. | |

* cited by examiner

PRESSURIZED HEAT-PRESS APPARATUSES AND ASSOCIATED METHODS

TECHNICAL FIELD

The present technology is directed generally to apparatuses and associated methods for heating and pressing a material. More particularly, the present technology relates to pressurized heat-press apparatuses that can effectively perform a heat-press process operated in a limited space.

BACKGROUND

A heat-press process is an important operation for processing or producing multiple types of agriculture products. Key factors to a successful heat-press process involve proper control of heat and pressure. Conventional pressurized heat-press apparatuses generally require a relatively large space to operate. This is due to the size and the arrangement of the components therein. Therefore, it would be beneficial to have an improved pressurized heat-press apparatus that can be operated in a limited space.

SUMMARY

The following summary is provided for the convenience of the reader and identifies several representative embodiments of the disclosed technology. Generally speaking, the present technology provides improved apparatuses and methods that enable a user to conveniently and automatically perform a heat-press process. More particularly, the present technology provides a pressurized heat-press apparatus that can be operated in a limited space and provides an advanced safety mechanism.

In representative embodiments, an apparatus of the present technology includes, for example, (1) a housing, (2) a pressure component positioned in the housing and configured to provide a force by pressurizing fluid (gas or liquid) positioned therein, (3) a linkage component operably coupled to the pressure component, (4) a first heating component coupled to the linkage component, and (5) a second heating component positioned adjacent to the first heating component. The linkage component is movable between a first position and a second position in the housing. When the linkage component is at the first position, the linkage component is positioned at a first (horizontal) level. When the linkage component is at the second position, the linkage component is positioned at a second (horizontal) level. The first (horizontal) level is further away from the pressure component than the second (horizontal) level. When the linkage component is at the second position, the linkage component applies the force generated by the pressure component on the first heating component, so as to move the first heating component toward the second heating component. The first and second heating components can generate heat and accordingly a material positioned therebetween can be heat-pressed.

The first level and second level can be at different heights. In some embodiments, the first level is higher than the second level, and the distance between the first and second levels corresponds to the distance of travel of the first heating component. As such, the locations of the first and second levels can be selected based on the desired amount of travel of the first heating component. Additionally, the apparatus can have more than two levels to process workpieces with different thicknesses.

One advantage of the present disclosure is that a pressurized heat-press apparatus in accordance with the present disclosure can be operated in a limited or narrow space. The linkage component positioned between the pressure component and the first heating component provides flexibility when determining how to position/configure the pressure component and the first heating component. By having the linkage component in accordance with the present disclosure, the first heating component does not need to be positioned along a direction in which the pressure component provides a force. In some embodiments, the first heating component and the pressure component can be in a side-by-side arrangement to reduce the overall height of the heat-press apparatus. The pressure component can include a cylinder (e.g., a pneumatic or hydraulic cylinder) that can extend to move the first heating component to a raised position, and the cylinder can contract to move the first heating component to a lower position. This enables a user to design or customize a pressurized heat-press apparatus that can be used in a limited or narrow space, without requiring the user to have a large housing that can accommodate a pressure component and a heating component positioned in a straight line.

Another advantage of the present disclosure is that the way the linkage component positioned in the pressurized heat-press apparatus can provide a safety mechanism. When an emergency event occurs (e.g., a user's hand is in contact with the first or second heating component), the apparatus can detect this event (e.g., by monitoring the pressure sensed by a pressure sensor positioned adjacent to the first or second heating component). Accordingly, the apparatus can immediate disengage the linkage component from the pressure component (e.g., by unlocking a locking component that can be controlled by a signal, or other suitable devices). As a result, the force from the pressure component stops being applied on the first heating component, and the first heating component can be easily/quickly moved away (e.g., from user's hand) without constrain from the pressure component. Therefore, the emergency event can be immediately mitigated (e.g., the user can move his/her hand quickly away from the first or second heating component).

Another aspect of the present technology is to provide a method for manufacturing a pressurized heat-press apparatus. In one embodiment, the method includes (1) positioning a pressure component in a housing, the housing defining an operating space, (2) positing a linkage component in the operating space and coupling the linkage component to the pressure component, (3) coupling a first heating component to the linkage component, and (4) positioning a second heating component adjacent to the first heating component. The pressure component is configured to provide a driving force by pressurizing fluid positioned in the pressure component. The linkage component is movable between a first position and a second position. When the linkage component is at the first position, the linkage component is positioned at a first horizontal level. When the linkage component is at the second position, the linkage component is positioned at a second horizontal level. The first horizontal level is farther relative to the pressure component than the second horizontal level. When the linkage component is at the second position, the linkage component applies the driving force on the first heating component to move the first heating component toward the second heating component. Accordingly, a material positioned between the first and second heating components can be heat-pressed.

Yet another aspect of the present technology is to provide a method for operating a pressurized heat-press apparatus. In an embodiment, the method includes (1) positioning a linkage component at a first position inside a housing, and (2) moving the linkage component to a second position by a driving force provided by a pressure component coupled to the linkage component. The driving force is generated by pressurizing fluid positioned in the pressure component. When the linkage component is at the first position, the linkage component is positioned at a first horizontal level. When the linkage component is at the second position, the linkage component is positioned at a second horizontal level. The second horizontal level is closer relative to the pressure component than the first horizontal level. When the linkage component is at the second position, the linkage component applies the driving force on a first heating component coupled to the linkage component so as to move the first heating component toward a second heating component positioned adjacent to the first heating component. Accordingly, a material positioned between the first and second heating components can be heat-pressed.

In some embodiments, a heat-press apparatus includes a housing, a first platen, a second platen, and a fluidic drive assembly. The fluidic drive assembly can be positioned within the housing and can include a shaft that moves the first platen and/or second platen. The fluidic drive assembly can contain a pressurized fluid (e.g., gas, liquid, hydraulic fluid, etc.) that moves the shaft. In one embodiment, the pressurized fluid causes translation of the shaft to move the first platen from a first position for positioning a workpiece in a gap between the first and second platens to a second position for compressing the workpiece. The workpiece can be a monolayer or multilayer structure suitable for undergoing a heat-press process.

The first platen can be horizontally adjacent to a pressurization component in the fluid drive assembly when the heat-press apparatus is supported by a horizontal support surface. For example, the first platen can be horizontally adjacent to a hydraulic or pneumatic cylinder that contains the pressurized fluid. This provides a relatively compact fluid drive assembly to reduce the overall size of the heat-press apparatus. In some embodiments, an uppermost part of the fluid drive assembly can have a link that connects the shaft directly or indirectly to the first platen. The link can push the first platen downwardly toward the second platen based on movement of the shaft. This side-by-side arrangement has a relatively low height for reducing the overall height of the housing. In certain embodiments, the heat-press apparatus can further include an elongate member coupled to the first platen. The elongate member and the shaft can extend vertically in the same direction from the link when the heat-press apparatus is supported by a horizontal support service. For example, the elongate member and the shaft can be generally parallel to one another and can extend downwardly from the link at a generally horizontal orientation. In some embodiments, longitudinal axes of the elongate member and the shaft are generally parallel to each other, and a longitudinal axis of the link can extend in a direction generally perpendicular to the axes.

Apparatuses and methods in accordance with embodiments of the present technology can include any one or a combination of any of the foregoing elements described above.

DETAILED DESCRIPTION

1. Overview

The present technology is directed generally to apparatuses and associated methods for heating and pressing a material (e.g., agricultural materials). A representative apparatus can include a housing, a fluidic drive assembly within the housing, a first platen, and a second platen. When the first platen is at an open position, a workpiece can be placed between the first and second platens. The fluid drive assembly is configured to drive the first platen toward the second platen to compress the workpiece. The first platen can include a heater and is configured to transfer heat from the heater to the workpiece. In some embodiments, the second platen includes a heater such that opposite sides of the workpiece can be heated. The fluidic drive assembly can include one or more pressurization devices, pneumatic actuators, hydraulic actuators, linkages, connectors, and/or suitable components for moving the first platen and/or second platen.

A representative apparatus can include a housing (e.g., having multiple housing components), a pressure component (e.g., a cylinder, a spring, and/or other suitable components that can provide a continuous force) positioned in the housing, a linkage component operably coupled to the pressure component, a first heating component coupled to the linkage component, and a second heating component positioned adjacent to the first heating component. By pressurizing fluid positioned therein, the pressure component provides a driving force to the linkage component. The linkage component can transfer/apply the driving force to/on the first heating component. The linkage component can be movable between a first position and a second position. When the linkage component is at the first position, the linkage component is positioned at a first level. When the linkage component is at the second position, the linkage component is positioned at a second level, the first level is farther relative to the pressure component than the second level. In some embodiments, the linkage component can be position at the first/second levels without being parallel to these levels. For example, the linkage component can form an angle with the first level, and the angle can be determined by the shape of the housing (which can be determined based on the space where the apparatus needs to be operated).

In some embodiments, a material to be heat-pressed can be positioned between the first and second heating components and then is heat-pressed at one or more pre-determined operating conditions. For example, the material can be heat-pressed at a certain temperature (or in some temperature range), under a specific pressure (or in a particular pressure range), and/or for a particular period of time.

When the linkage component is at the first position, the apparatus allows the user to put the material to be heat-pressed in the apparatus (or remove a heat-pressed material therefrom). When the linkage component is at the second position, the linkage component applies a continuous force from the pressure component on the first heating component. By so doing, the first heating component is moved toward the second heating component and then the material can be heat-pressed.

The linkage component can have coupled to the pressure component and the heating component in multiple ways. In some embodiments, for example, the linkage component can be coupled to the pressure component and the first heating component by connecting members (e.g., a shaft, an elongated member, a rod, and/or other suitable components). In some embodiments, the two connecting members can be positioned parallel to each other.

The pressurized heat-press apparatuses in accordance with the present technology can provide a user with a safety protection mechanism. When an emergency event (e.g., a user's hand is in contact with the first or second heating component) is detected (e.g., monitored by a sensor of the apparatus) or reported (e.g., a user pushes an emergency button of the apparatus), the apparatus can immediate disengage the linkage component from the pressure component. In some embodiments, the linkage component can be disengaged from the first heating component in a similar fashion. As a result, the disengagement of the linkage component effectively stops the force from the pressure component to the first heating component. More importantly, the first heating component is no longer linked to, and thus not restrained by, the pressure component. Therefore, the emergency event can be immediately mitigated.

Several details describing structures or processes that are well-known and often associated with heat-press apparatuses and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations and/or different components than those described in this section. Accordingly, the technology may have other embodiments with additional elements and/or without several of the elements described below with reference to FIGS. 1-7. FIGS. 1-7 are provided to illustrate representative embodiments of the disclosed technology. Unless provided for otherwise, the drawings are not intended to limit the scope of the claims in the present application.

2. Representative Embodiments

Figure 1:
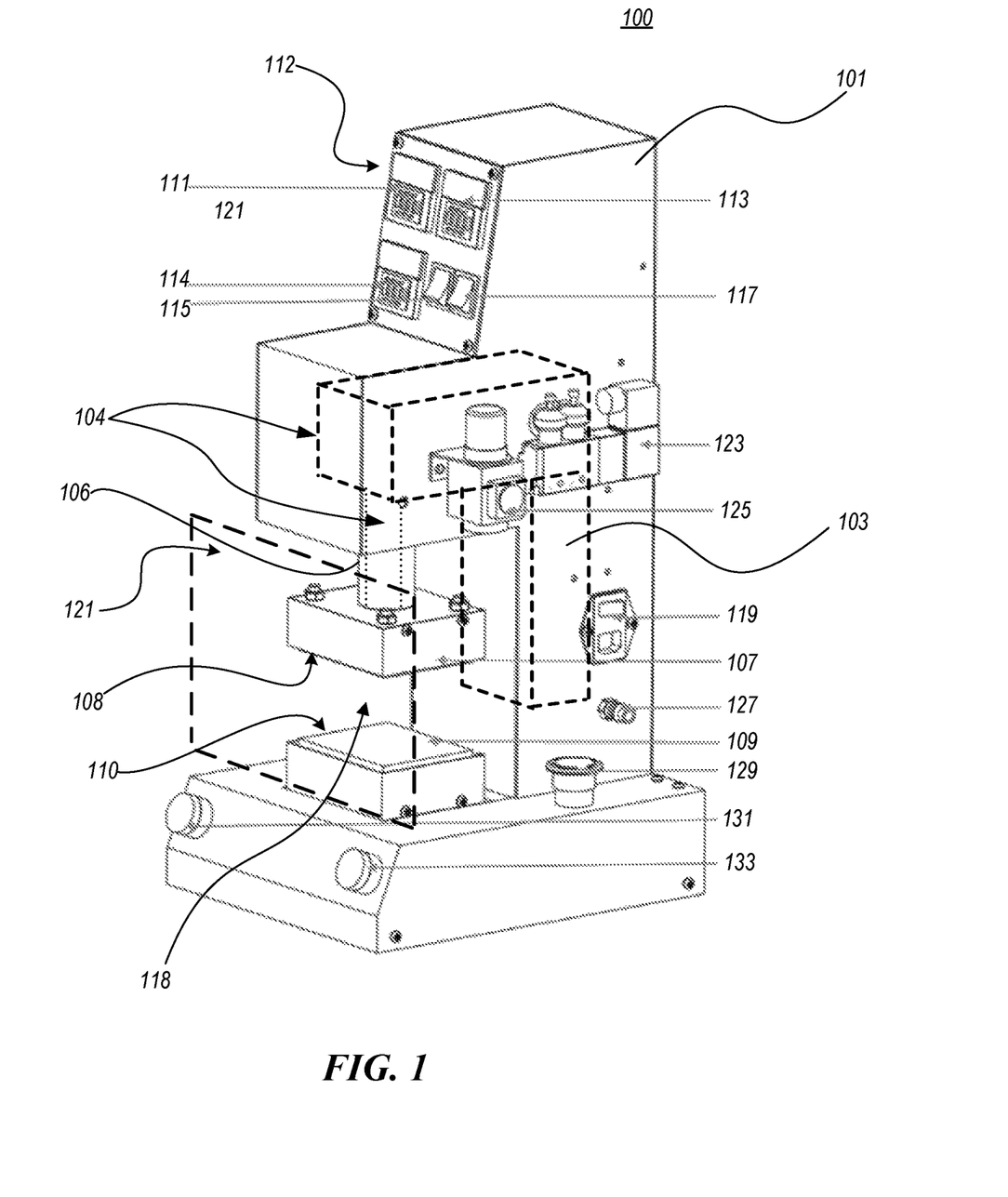
FIG. 1 is an isometric view of an apparatus configured in accordance with representative embodiments of the disclosed technology.

FIG. 1 is an isometric view of an apparatus 100 configured in accordance with representative embodiments of the present technology. The apparatus 100 can include a housing 101, a fluidic drive assembly 103 positioned in the housing 101, a linkage component 104 coupled to the pressure component, a first heating component 107 coupled to the linkage component 104, and a second heating component 109. The fluidic drive assembly 103 can include one or more pressure components (which are not visible in FIG. 1 and will be discussed below in detail with reference to FIGS. 2-4) and can occupy a relatively small space to reduce the overall size of the apparatus 100. In some embodiments, the fluidic drive assembly 103 can have a generally C-shaped configuration with pneumatic or hydraulic cylinders positioned adjacent to the first and second heating components 107, 109. The housing 101 is configured to at least partially accommodate and/or protect the other components/elements of the apparatus 100.

The fluidic drive assembly 103 can be configured to generate a force by pressurizing fluid (e.g., gas or liquid) positioned therein, receiving pressurized fluid, or the like. In some embodiments, the fluidic drive assembly 103 can include one or more pumps for pressurizing fluid contained in, for example, a tank, a chamber. In some embodiments, the fluid can be supplied to the fluidic drive assembly 103 from an external source (e.g., a gas tank, a hydraulic device, and/or other suitable devices) via a hose connector 127 coupled to the housing 101. The fluidic drive assembly 103 can include a pressure component that is driven via the fluid, and the linkage component 104 is positioned to receive the force from the pressure component and then transfer it to the first heating component 107 coupled thereto. For example, in some embodiments, the pressure component can generate a force to push the linkage component 104 down. Accordingly, the linkage component 104 can then downwardly push the first heating component 107 coupled thereto. In some embodiments, the linkage component 104 can be an elongate member or a shaft that can be displaced downwardly and can be positioned within a cylindrical sleeve or guide 106 that is fixedly coupled to the housing 101. When the first heating component 107 is moved toward the second heating component 109, a material positioned between the first heating component 107 and the second heating component 109 can be heat-pressed under pre-determined conditions (e.g., at specific temperature, under particular pressure, and/or force profile). In some embodiments, the pressure component can include a cylinder, a spring, and/or other suitable components that can provide a desired resilient force.

In some embodiments, the first and second heating components 107, 109 can be made of metal or other suitable thermal-conductive materials. In some embodiments, the first and second heating components 107, 109 can be platens heated by electricity, gas, and/or other suitable energy sources. For example, the first and second heating components 107, 109 can include one or more resistive heaters, Peltier devices, gas heaters, or combinations thereof. In some embodiments, the surfaces 108, 110 of the respective first and second heating components 107, 109 can include patterns that can (1) facilitate the heat-press process (e.g., by increasing friction between the surfaces 108, 110 and an object or a material to be heat-pressed) and/or (2) generate a heat-press mark on an object or a material to be heat-pressed. Increased friction can reduce or limit movement of the objective material. In some embodiments, the first and second heating components 107, 109 can be made of different materials and/or have different patterns. In other embodiments, the surface 108, 110 can be generally smooth to provide uniform pressure to the object or material to be heat-pressed.

As shown in FIG. 1, the apparatus 100 can include a control system 112 with a first control/display panel 111 and a second control/display panel 113. In the illustrated embodiments, the first control/display panel 111 is configured to control and display the temperature of the first heating component 107. The second control/display panel 113 is configured to control and display the temperature of the second heating component 109. In some embodiments, the first control/display panel 111 and the second control/display panel 113 can be integrated as one control/display panel. In some embodiments, the temperatures of the first and second heating components 107, 109 can be controlled and/or monitored by a remote device (e.g., a smartphone with a software application installed).

In the illustrated embodiment shown in FIG. 1, the apparatus 100 includes a pressing time panel 114 configured to control a time period for heat-pressing and to display relevant information to a user. In some embodiments, the apparatus 100 can include addition control/display panels configured to control and display other parameters (e.g., pressure, locations, rotation angles, etc.) of the first/second heating components 107, 109, surfaces 108, 110, etc.

As shown in FIG. 1, the apparatus 100 can include a first control switch 115 positioned adjacent to the first control/display panel 111 and a second control switch 117 positioned adjacent to the second control/display panel 113. The first control switch 115 enables a user to turn on/off the first heating component 107, and the second control switch 117 enables the user to turn on/off the second heating component 109. By this arrangement, the user can determine whether a heat-press process needs heat from either one of the first/second heating components 107, 109 or both.

As shown in FIG. 1, the apparatus 100 can include a power connector 119 configured to be coupled with an external power source. In some embodiments, the apparatus 100 can include an internal power source (e.g., a power generator, a battery, etc.). The power connect 119 can further include a power switch configured to turn on/off the power.

The apparatus 100 includes a valve 123 coupled to the housing 101. The valve 123 is configured to control the fluid pressure of the fluid delivered to the fluidic drive assembly 103, the fluid pressure of the fluid within the pressure component, etc. The apparatus 100 also includes a pressure gauge 125 configured to monitor fluid pressure in the fluidic drive assembly 103. Positioning the valve 123 and the pressure gauge 125 outside the housing 101 provides convenience for process control and maintenance.

The apparatus 100 can include a protective component 121 positioned adjacent to the first/second heating components 107, 109. The protective component 121 is configured to prevent a user from reaching the first/second heating components 107, 109 during a heat-press process. In some embodiments, the protective component 121 can be made of a transparent material such as plastic, glass, resin, etc. In some embodiments, the protective component 121 can completely surround the space where the first/second heating components 107, 109 operate or a gap 118 between the first and second components 107, 109. In such embodiments, a user may need to open or remove the protective component 121 so as to put a material to be heat-pressed in (or remove a heat-pressed material from) the gap 118. In some embodiments, the protective component 121 can be shaped or formed in accordance with the shape of the housing 101 (e.g., to make the apparatus have an overall seamless shape or smooth appearance).

In the illustrated embodiments, the apparatus 100 includes an emergency stop switch 129 coupled to the housing 101. The emergency stop switch 129 is configured to be turned on by a user when an emergency happens. When the emergency stop switch 129 is turned on, an emergency signal is then generated. In some embodiments, in response to the emergency signal, the pressure component can be stopped. In some embodiments, in response to the emergency signal, the linkage component 104 can be disengaged from the pressure component (e.g., so as to stop transferring the force from the pressure component). In some embodiments, in response to the emergency signal, the linkage component 104 can be disengaged from the first heating component 107. The disengagement can be completed by unlocking a locking device, loosening a nut/clip, and/or other suitable means. In some embodiments, in response to the emergency signal, the first heating component 107 is moved away from the second heating component 109.

As shown in FIG. 1, the apparatus 100 includes a left safety switch 131 and a right safety switch 133. The left safety switch 131 is coupled to the housing 101 and configured to be operated by one hand of a user. The right safety switch 133 is coupled to the housing 101 and positioned opposite to the left safety switch 131. The right safety switch 133 is configured to be operated by the other hand of the user. To prevent user's hands from reaching to the operational space of the first heating component 107, when a user wants to initiate a heat-press, the user needs to position his/her hands on the left/right safety switches 131, 133, respectively. In some embodiments, the left/right safety switches 131, 133 can be positioned at different locations of the apparatus 100.

The control system 112 can include one or more controllers, processors, and/or a computer configured to control other components of the apparatus 100. For example, a controller can be in communication with the first control/display panel 111 and/or the second control/display panel 113 and can control operation of the fluidic drive assembly 103 based on user input. In some embodiments, the control system 112 can further include a memory, a storage device (hard drive, flash drive, etc.), and/or other suitable device configured to temporarily or permanently store data or information (e.g., operation parameters/logs, materials that have been heat-pressed, etc.) associated with the apparatus 100. In some embodiments, the stored data or information can be transmitted to a remote device (e.g., a smartphone, a computer, a portable device, a database, etc.).

The control system 112 can contain computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices (including palm-top computers, wearable computers, cellular or mobile phones, multi-processor systems, processor-based or programmable consumer electronics, network computers, mini computers, a programmed computer chip, and the like). Information handled by these computers and controllers can be presented at any suitable display medium, including a CRT display or an LCD. For example, the first and second control/display panels 111, 113 and the pressing time panel 114 can include LCDs. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, or other suitable medium. In particular embodiments, the term "component" can include hardware, firmware, or a set of instructions stored in a computer-readable medium.

Figure 2:
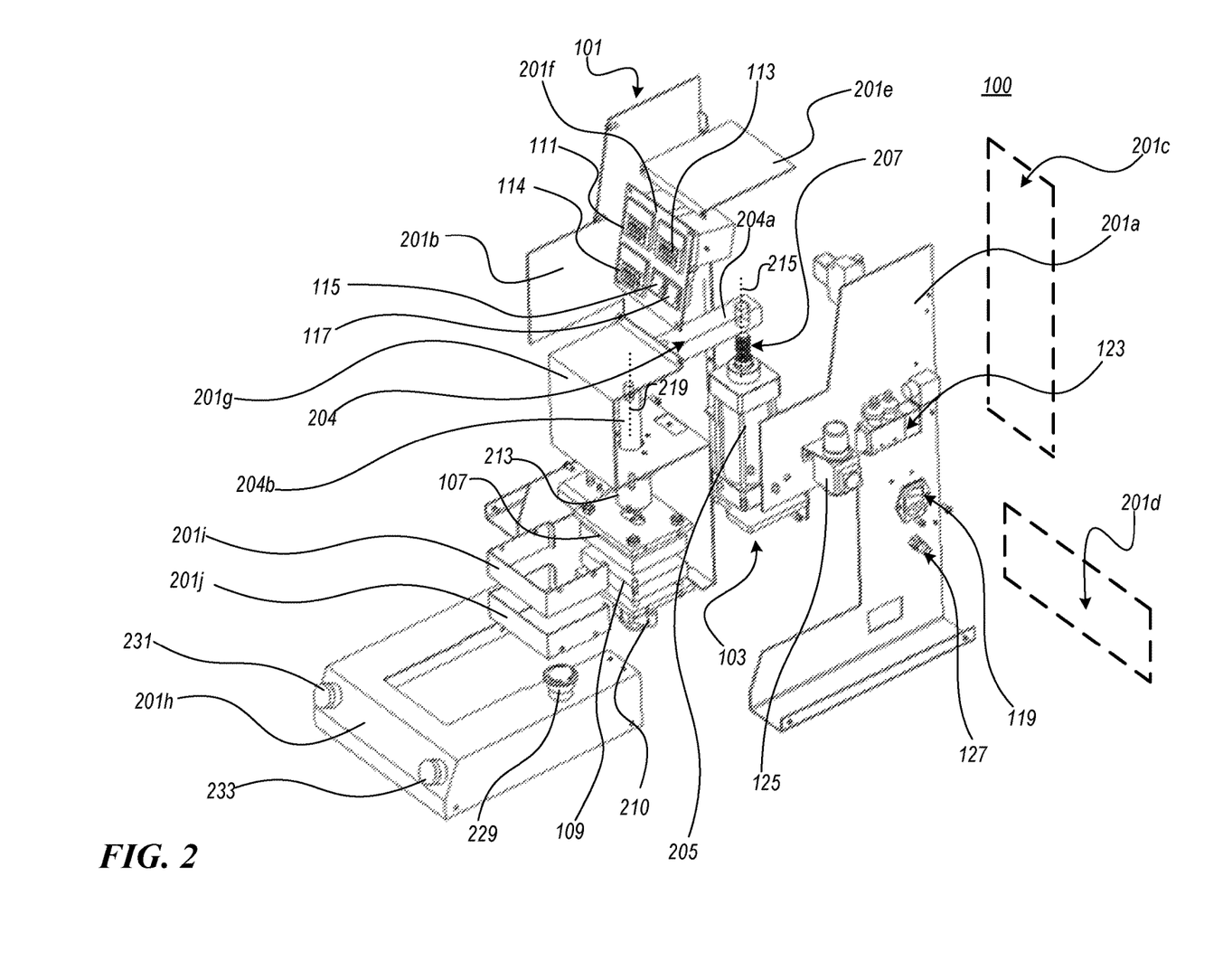
FIG. 2 is an exploded, isometric view of an apparatus configured in accordance with representative embodiments of the disclosed technology.

FIG. 2 is an exploded view of the apparatus 100 configured in accordance with representative embodiments of the present technology. In the illustrated embodiment, the housing 101 (shown as housing components 201a-201j in FIG. 2) protects the fluidic drive assembly 103 with a pressure component 205 a linkage component 204. The linkage component 204 is coupled to the pressure component 205, which is positioned in the housing 101, and a first heating component 107. The apparatus 100 includes an adjustable supporting component 210 (to be discussed in detail below with reference to FIG. 5A) coupled to the second heating component 109.

As shown in FIG. 2, the housing 101 includes (1) a first side housing component 201a, (2) a second side housing component 201b opposite to the first housing 201a, (3) an upper back housing component 201c, (4) a lower back housing component 201d, (5) a top housing component 201e, (6) an upper front housing component 201f, (7) a middle front housing component 201g, (8) a lower front housing component 201h, (9) a first cover component 201i configured to accommodate the first heating component 107, and (10) a second cover component 201j configured to accommodate the second heating component 109. The housing components 201a-j are configured to at least partially accommodate and/or protect the other components/elements of the apparatus 100. In other embodiments, however, the housing components 201a-j can have different configurations depending on various design needs.

In the illustrated embodiments, the middle front housing component 201g is configured to cover a portion of the linkage component 204 and the pressure component 205. With this arrangement, the linkage component 204 can be easily reached from the outside of the housing 101, which provides a convenient access to the linkage component 204 when it needs to be maintained or replaced. In other embodiments, however, the housing components 201a-j can have different configurations depending on various design needs.

The linkage component 204 includes a link or an arm 204a ("link 204a") and a connecting member 204b (operations regarding the linkage component 204 will be discussed in detail below with reference to FIGS. 3 and 4). As shown in FIG. 2, the link 204a is connected to and extends between a member 207 of the pressure component 205 and the connecting member 204b. The member 207 can be a shaft (e.g., a piston rod) of the pressure component 205, which can be a hydraulic or pneumatic actuator. The connecting member 204b can be an elongate member or shaft extending through a guide sleeve 213. For example, the connecting member 204b can be a shaft fixedly coupled to the link 204a and the first heating component 107. To reduce the overall height of the fluidic drive assembly 103, the member 207 and connecting member 204b extend downwardly from the link 204a. This limits the overall height and distances travelled of the fluidic drive assembly 103, thereby allowing the overall size of the housing 101 to be reduced. In some embodiments, the connecting member 204b and the member 207 have longitudinal axes that are generally parallel to one another and extend from the same side out the link 204a.

In some embodiments, the member 207 is fixedly coupled to one end of the link 204a. The connecting member 204b is fixedly coupled to the other end of the connecting member 204b and the first heating component 107. In the illustrated embodiments, the member 207 has a longitudinal axis 215 that is substantially parallel to a longitudinal axis 219 of the connecting member 204b. The link 204a can extend in a direction that is generally perpendicular to the longitudinal axes 217, 219 such that the member 207 and connecting member 204b translate together. In one embodiment, an end of the member 207 can be received in a hole of the link 204a and an end of the connecting member 204b is received in another hole of the link 204a. The link 204a can be sufficiently rigid to keep the member 207 and the connecting member 204b generally parallel to one another. In other embodiments, the link 204a, the connecting member 204b, and the member 207 can have a one-piece construction and can be molded, machined, or made by another suitable technique. In other embodiments, the member 207 can be positioned such that its longitudinal axis 217 forms an angle with the longitudinal axis 119 of the second connecting member 204b.

The pressure component 205 is configured to generate a force by pressurizing fluid (e.g., gas or liquid) positioned therein. In some embodiments, the fluid can be supplied to the pressure component 205 from an external source via a hose connector 127 coupled to the housing 101. In other embodiments, the fluidic drive assembly 103 includes one or more pumps for pressurizing the working fluid to move a piston head in a cylindrical body. The linkage component 204 is positioned to receive the force from the pressure component 205 and then transfer it to the first heating component 107 coupled thereto. For example, the member 207 can apply a linear force to the end of the link 204a, which in turn applies a corresponding linear force to the connecting member 204b. In the illustrated embodiments, when a user wants to initiate a heat-press process, the user can turn on the power of the apparatus 100 by pressing a power button 119. The apparatus 100 can then control the pressure component 205 to move the linkage component 204 by adjusting the pressure of the fluid in the pressure component 205.

The linkage component 204 can be moved between a first position and a second position (embodiments regarding the first/second positions will be discussed below with reference to FIGS. 3 and 4). When the linkage component 204 is at the first position (e.g., FIG. 3), the apparatus 100 allows the user to put a material to be heat-pressed in the apparatus (or remove a heat-pressed material therefrom). In some embodiments, the user can control the pressure component 205 to upwardly move the first heating component, such that the user can have more operating space to insert/position a material to be heat-pressed or to perform other tasks. Once the material to be heat-pressed is properly positioned and ready to be process, the user can control the pressure component 205 to downwardly move the linkage component 204 to the second position (e.g., FIG. 4B). When the linkage component 204 is at the second position, the linkage component 204 can continuously apply a force on the first heating component 107 and therefore hold the first heating component 107 stationary relative to the second heating component 109. Accordingly, a material positioned between the first heating component 107 and the second heating component 109 can be heat-pressed.

In some embodiments, the second position is set by the thickness of the workpiece. In other embodiments, the second heating component 109 can be moved vertically such that the second position of the first heating component 107 can be same when processing workpieces with different thicknesses. In the illustrated embodiment, the second heating component 109 is coupled to and supported by the adjustable supporting component 210. The adjustable supporting component 210 is configured to adjust the position of the second heating component 109 such that the apparatus 100 can perform a heat-press process at a pre-determined operating condition. For example, by adjusting the location of the second heating component 109, the apparatus 100 can control a heat-press process under a specific pressure (or in a particular pressure range). Having such flexibility is beneficial at least because it enables a user to customize various heat-press processes for different types of materials to be heat-pressed (or different volumes of a same material to be heat-pressed). Embodiments of the adjustable supporting component 210 will be discussed in detail below with reference to FIG. 5A.

As also shown in FIG. 2, the apparatus 100 includes a first control/display panel 111 and a second control/display panel 113 position on the upper front housing component 201f. In the illustrated embodiment, the first control/display panel 111 is configured to control and display the temperature of the first heating component 107. The second control/display panel 113 is configured to control and display the temperature of the second heating component 109. As shown, the apparatus 100 also includes a pressing time panel 114 configured to control a time period for heat-pressing and to display relevant information to a user. In some embodiments, the apparatus 100 can include addition control/display panels configured to control and display other parameters (e.g., pressure, locations, rotation angles, etc.) of the first/second heating components 107, 109 (or other components). In some embodiments, the first control/display panel 111, the second control/display panel 113, and the pressing time panel 114 can be integrated as one control/display panel.

As shown in FIG. 2, the apparatus 100 includes an emergency stop button 229 coupled to the housing 101. The emergency stop button 229 is configured to be pressed by a user when an emergency happens. When the emergency stop button 229 is pressed, an emergency signal is then generated. In some embodiments, in response to the emergency signal, the pressure component 205 can be immediately stopped. In some embodiments, in response to the emergency signal, the linkage component 204 can be immediately disengaged from the pressure component 205 (e.g., so as to stop transferring the force from the pressure component 205). In some embodiments, in response to the emergency signal, the linkage component 204 can be immediately disengaged from the first heating component 107. The disengagement can be completed by sending a signal to a controller that can unlock a locking device, loosen a nut/clip, etc. In some embodiments, in response to the emergency signal, the first heating component 107 is moved further away from the second heating component 109.

As shown in FIG. 2, the apparatus 100 includes a left safety button 231 and a right safety button 233. The left safety button 231 is coupled to the housing 101 and configured to be operated by one hand of a user. The right safety button 233 is coupled to the housing 101 and positioned opposite to the left safety button 231. The right safety button 233 is configured to be operated by the other hand of the user. To prevent user's hands from reaching to the operational space of the first heating component 107, when a user wants to initiate a heat-press, the user need to position his/her hands on the left/right safety buttons 231, 233, respectively. In some embodiments, the left/right safety buttons 231, 233 can be positioned at different locations of the apparatus 100. The apparatus 100 also includes a valve 123 coupled to the housing 101. The valve 123 is configured to control the fluid pressure in the pressure component 205.

Figure 3:
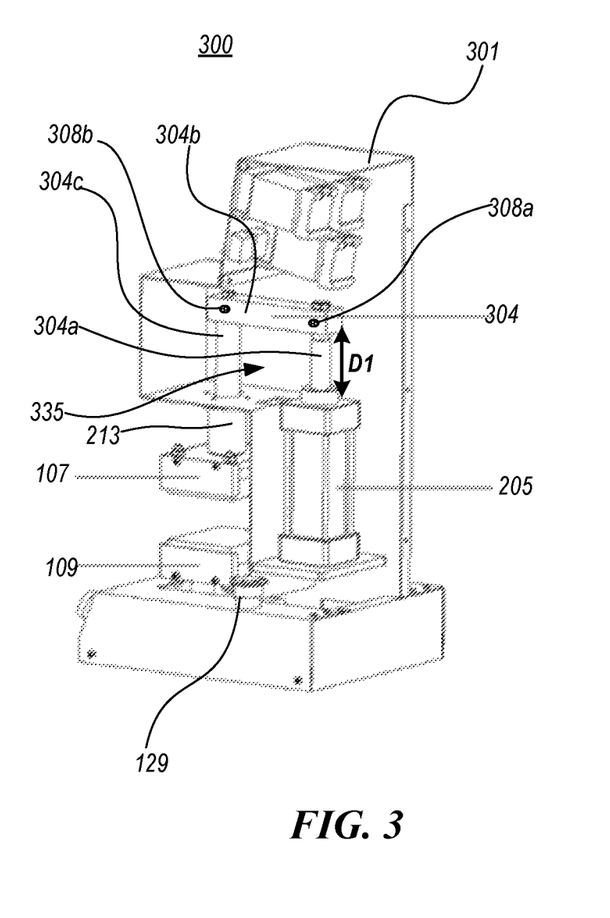
FIGS. 3 and 4 are partial, isometric views illustrating operations of an apparatus configured in accordance with representative embodiments of the disclosed technology.
Figure 4:
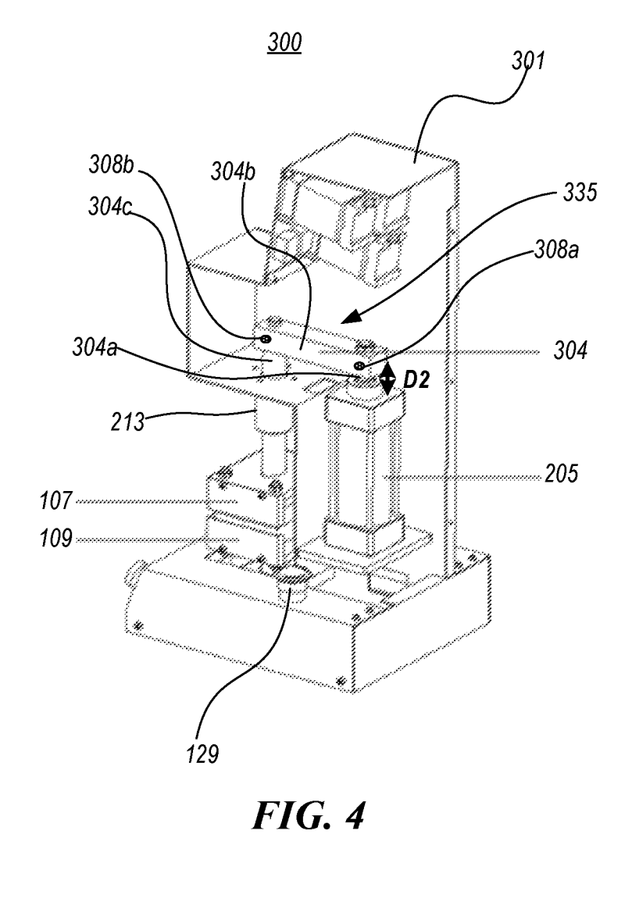

FIGS. 3 and 4 are partial, isometric views illustrating operations of an apparatus 300 configured in accordance with representative embodiments of the present technology. The apparatus 300 includes a housing 301, a pressure component 205 (e.g., a double-acting cylinder) positioned in the housing 301, a linkage component or linkage assembly 304 coupled to the pressure component 205, a first heating component 107 coupled to the linkage component 304, a second heating component 109 positioned adjacent to the first heating component 107, and an emergency stop switch 129 coupled to the housing 301. In the illustrated embodiment, the housing 301 defines an operating space 335 therein. The linkage component 304 can be moved between a first position and a second position in the in the operating space 335.

As shown in FIG. 3, the linkage component 304 includes a first connecting member or shaft 304a, a center linkage member 304b, and a second connecting member or elongated member 304c. As shown, the first connecting member 304a is coupled to one end of the center linkage member or link 304b by a first locking device 308a. In some embodiments, for example, the first locking device 308a can be a bolt positioned to pass through a first hole of the first connecting member 304a and a second hole of the center linkage member 304b at the same time. When the bolt is positioned in the first/second holes, the center linkage member 304b cannot move relative to the first connecting member 304a. Once the bolt is moved out of one of the first/second holes, the center linkage member 304b can then freely move relative to the first connecting member 304a. In some embodiments, in response to an emergency signal trigged by an event (e.g., a user presses the emergency stop switch 129), the first locking device 308a can be unlocked (e.g., moved by a motor coupled to the first locking device 308a and controlled by a processor of the apparatus 301). Accordingly, the center linkage member 304b can be disengaged from the first connecting member 304a.

In other embodiments, the first locking device 308a can be positioned between the first connecting member 304a and the pressure component 205. In such embodiments, in response to an emergency signal trigged by an event, the first locking device 308a can be unlocked and accordingly the pressure component 205 can be disengaged from the first connecting member 304a.

As shown in FIG. 3, the second connecting member 304c is coupled to the other end of the center linkage member 304b by a second locking device 308a. In some embodiments, for example, the second locking device 308b can be a bolt positioned to pass through a third hole of the second connecting member 304c and a fourth hole of the center linkage member 304b at the same time. When the bolt is positioned in the third/fourth holes, the center linkage member 304b cannot move relative to the second connecting member 304c. Once the bolt is moved out of one of the third/fourth holes, the center linkage member 304b can then freely move relative to the second connecting member 304c. In some embodiments, in response to an emergency signal trigged by an event, the second locking device 308b can be unlocked and accordingly the center linkage member 304b can be disengaged from the second connecting member 304c.

In other embodiments, the second locking device 308b can be positioned between the second connecting member 304c and the first heating component 107. In such embodiments, in response to an emergency signal trigged by an event, the second locking device 308b can be unlocked and accordingly the first heating component 107 can be disengaged from the second connecting member 304c.

In the illustrated embodiments, the first connecting member 304a is positioned substantially parallel to the second connecting member 304c. In other embodiments, the first connecting member 304a can be positioned to form an angle with the second connecting member 304c. In some embodiments, the first and second connecting members 304a, 304b can include a shaft, an elongated member, a rod, and/or other suitable components.

The pressure component 205 is configured to generate a force by pressurizing fluid (e.g., gas or liquid) positioned therein. The linkage component 204 is positioned to receive the force from the pressure component 205 and then transfer it to the first heating component 107 coupled thereto. In the illustrated embodiments, when a user wants to initiate a heat-press process, the user can turn on the power of the apparatus 300. Then the apparatus 300 can control the pressure component 205 to move the linkage component 304 by adjusting the pressure of the fluid in the pressure component 205.

The linkage component 304 can be moved between a first position and a second position. In FIG. 3, the linkage component 304 is at a first position. When the linkage component 304 is at the first position, the center linkage member 304b and the pressure component 205 are separate by a first distance D1, and the apparatus 300 allows a user to put a material to be heat-pressed in the apparatus (or remove a heat-pressed material therefrom). Once the material to be heat-pressed is properly positioned and ready to be process, the user can control the pressure component 205 to downwardly move the linkage component 304 to a second position as shown in FIG. 4.

When the linkage component 204 is at the second position, the center linkage member 304b and the pressure component 205 are separate by a second distance D2 (less than the first distance D1), and the linkage component 304 can continuously apply a force on the first heating component 107 so as to hold the first heating component 107 stationary relative to the second heating component 109. Accordingly, the material positioned between the first heating component 107 and the second heating component 109 can be heat-pressed.

Figure 5A:
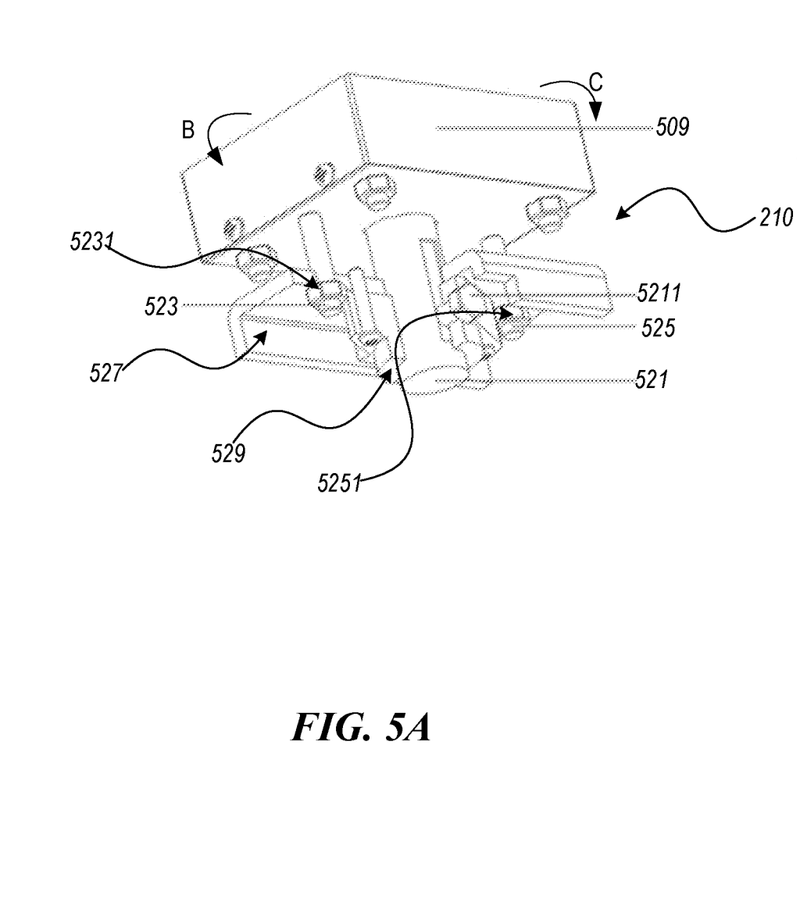
FIG. 5A is an isometric view of an adjustable supporting component of the apparatus and a heating component of the apparatus
Figure 5B:
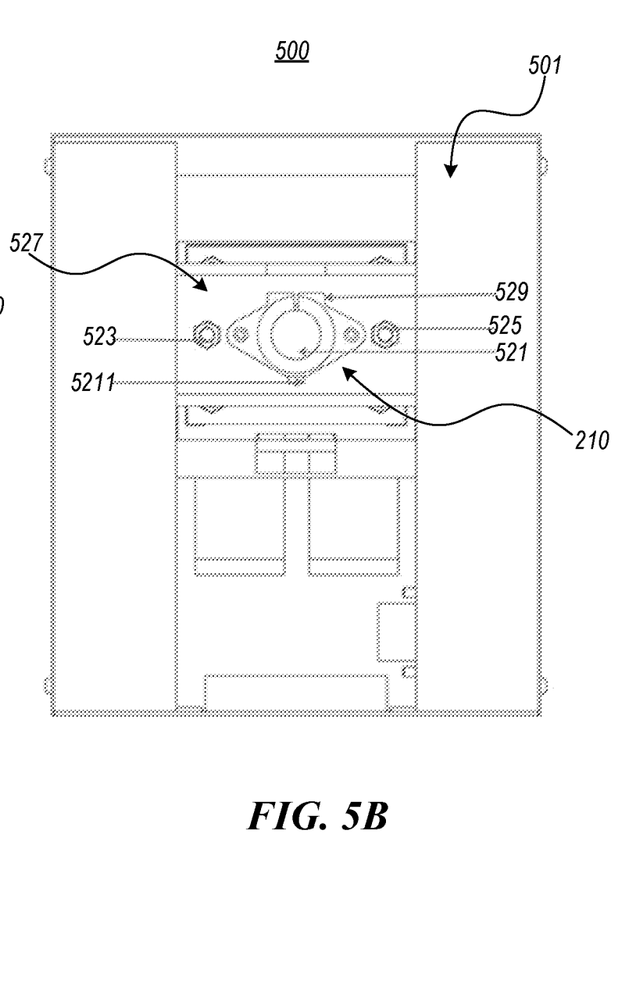
FIG. 5B is a bottom view of an apparatus configured in accordance with representative embodiments of the present technology.

FIG. 5A is an isometric view of an adjustable supporting component 210 and a heating component 509 configured in accordance with representative embodiments of the present technology. FIG. 5B is a bottom view of an apparatus 500 having the adjustable supporting component 210 and the heating component 509 shown in FIG. 5A. The adjustable supporting component 210 can be operated to move the heating component 509 and can include a post 521 coupled to the heating component 509. The adjustable supporting component 210 further includes a platform 527 fixedly attached to a housing 501 of the apparatus 500. (In the isometric view of FIG. 5A, the platform 527 is shown as a cut-out component only to provide a clearer view of the components positioned adjacent thereto.) The platform 527 is coupled to a clamping component 529. The clamping component 529 and the platform 527 together define a center opening that can accommodate the post 521.

The adjustable supporting component 210 further includes a guide bolt 5211 configured to be selectively in contact with the post 521. When the guide bolt 5211 is in contact with the post 521, the post 521 is fixed and cannot move relative to the platform 527. When the guide bolt 5211 is not in contact with the post 521, the post 521 can be (e.g., vertically) moved by a user in the center opening, which accordingly enables the user to adjust the (e.g., vertical) position of the heating component 509.

The adjustable supporting component 210 also includes a first bolt 523 and a second bolt 525 positioned opposite to the first bolt 523. The first bolt 523 and the second bolt 525 are both coupled to the heating component 509. The platform 527 includes a first opening configured to accommodate the first bolt 523 and a second opening configured to accommodate the second bolt 525. The first bolt 523 is coupled to the platform 527 via a first nut 5231, and the second bolt 525 is coupled to the platform 527 via a second nut 5251. By adjusting (e.g., rotating) the first/second bolts 5231, 5251, a user can adjust the (e.g., horizontal) position of the heating component 509. For example, when a user adjusts the first nut 5231 to decrease the distance between the platform 527 and the heating component 509, the heating component 509 can accordingly rotate in direction B. Similarly, when a user adjusts the second nut 5251 to decrease the distance between the platform 527 and the heating component 509, the heating component 509 accordingly rotates in direction C. By this arrangement, the user can effectively adjust or fine-tune the (e.g., horizontal) position of the heating component 509.

Figure 6:
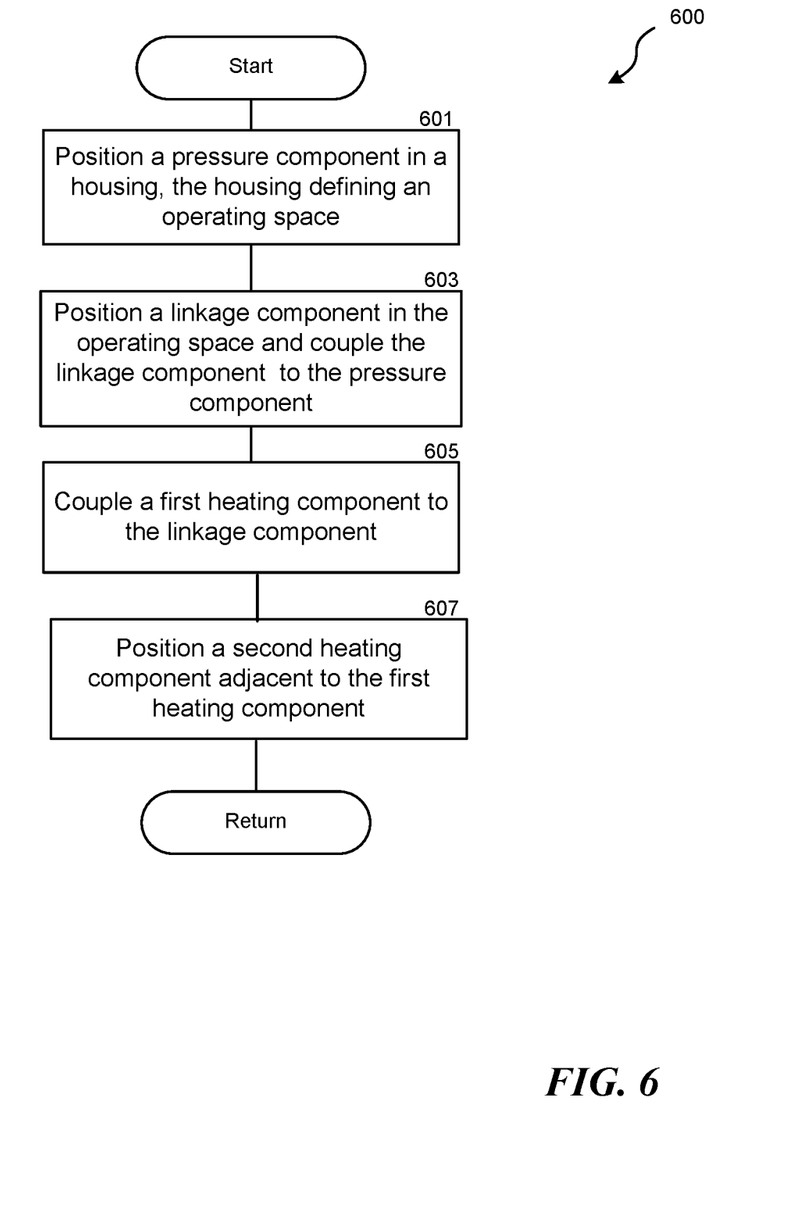
FIG. 6 is a flowchart illustrating a method in accordance with representative embodiments of the disclosed technology.

FIG. 6 is a flowchart illustrating a method 600 in accordance with representative embodiments of the present technology. The method 600 can be implemented to manufacture an apparatus (e.g., the apparatus 100, 300, or 500 discussed above) in accordance with the present technology. At block 601, the method 600 includes positioning a pressure component in a housing. The pressure component is configured to provide a driving force by pressurizing fluid positioned in the pressure component. The housing defines an operating space. At block 603, the method 600 continues to position a linkage component in the operating space and couple the linkage component to the pressure component. The linkage component is movable between a first position and a second position in the operating space. When the linkage component is at the first position (e.g., FIG. 3), the linkage component is positioned at a first (horizontal) level. When the linkage component is at the second position (e.g., FIG. 4), the linkage component is positioned at a second (horizontal) level. The first level is farther relative to the pressure component than the second level. When the linkage component is at the second position, the linkage component applies the driving force on the first heating component to hold the first heating component stationary relative to the second heating component.

The method 600 continues, at block 605, by coupling a first heating component to the pressure component. At block 607, the method 600 then positions a second heating component adjacent to the first heating component. The method 600 then returns for further instructions.

Figure 7:
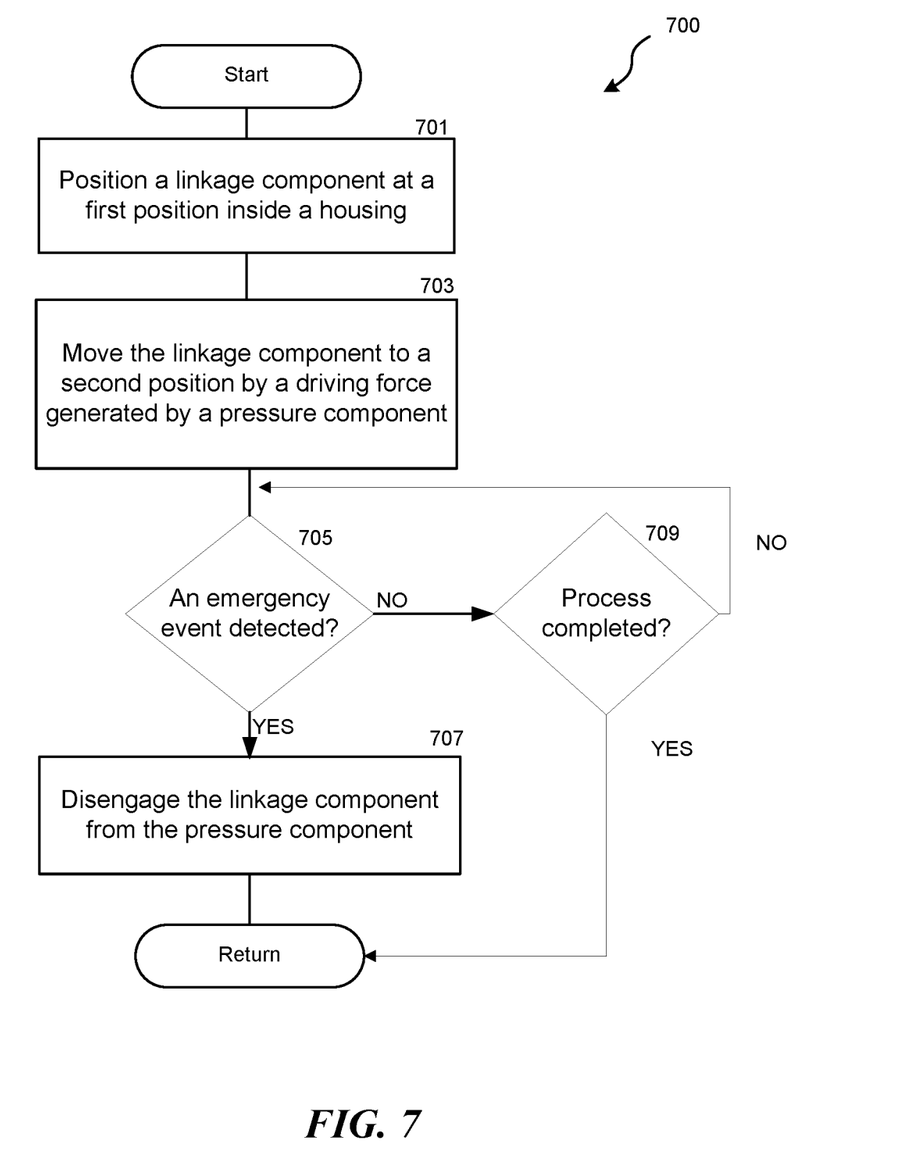
FIG. 7 is a flowchart illustrating a method in accordance with representative embodiments of the disclosed technology.

FIG. 7 is a flowchart illustrating a method 700 in accordance with representative embodiments of the present technology. The method 700 can be implemented to operate an apparatus (e.g., the apparatus 100, 300, or 500 discussed above) in accordance with the present technology. At block 701, the method 700 starts by positioning a linkage component at a first position inside a housing of the apparatus. At block 703, the method 700 moves the linkage component to a second position by a driving force generated by a pressure component coupled to the linkage component. When the linkage component is at the second position, the linkage component is positioned at a first level. When the linkage component is at the second position, the linkage component is positioned at a second level. The second level is closer relative to the pressure component than the first level.

At decision block 705, the method 700 determines whether there is an emergency event detected. If the determination is positive, then the process moves to block 707 and the linkage component is immediately disengaged from the pressure component (see e.g., FIG. 3 and associated descriptions). In other embodiments, the method 700 can disengage the linkage component from a heating component. In some embodiments, the method 700 can let the linkage component be separated into two portions. The method 700 then returns for further instructions.

If the determination at decision block 705 is negative, the process moves to decision block 709, where the method 700 determines whether a heat-press process is complete. If so, then the process returns for further instructions. If not, then the process moves back to decision block 705 for further determination.

From the foregoing, it will be appreciated that specific embodiments of the technology have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

We claim:

1. An apparatus for pressing and heating a material, the apparatus comprising:
    a housing;
    a first platen;
    a second platen;
    a pressure component positioned in the housing and configured to provide a driving force by pressurizing fluid positioned in the pressure component;
    a linkage component coupled to the pressure component, the linkage component being movable between a first position and a second position, when the linkage component is at the first position, the linkage component being positioned at a first level, when the linkage component is at the second position, the linkage component being positioned at a second level, the first level being further away from the pressure component than the second level;
    a left safety switch coupled to the housing and configured to be operated by one hand of a user; and
    a right safety switch coupled to the housing and positioned opposite to the left safety switch, the right safety switch being configured to be operated by the other hand of the user;
    wherein, when the left safety switch and the right safety switch are turned on, the pressure component provides the driving force; and
    wherein the linkage component is coupled to the first platen such that, when the linkage component is at the second position, the linkage component applies the driving force on the first platen to compress a workpiece between the first and second platens while at least one of the first platen or second platen heat the workpiece.

2. The apparatus of claim 1, wherein the linkage component includes a piston rod movably coupled to the pressure component, an elongate member fixedly coupled to the first platen, and a link fixedly coupled to the piston rod and fixedly coupled to the elongate member, wherein the piston rod and elongate member extend downwardly from the link when the apparatus is supported by a horizontal surface.

3. The apparatus of claim 1, wherein the linkage component includes a first connecting member, a center linkage member, and a second connecting member, and wherein the linkage component is coupled to the pressure component via the first connecting member, and wherein the linkage component is coupled to the first platen by the second connecting member.

4. The apparatus of claim 3, wherein the first connecting member includes a first elongated member, and wherein the second connecting member includes a second elongated member, and wherein the first elongated member is positioned parallel to the second elongated member.

5. The apparatus of claim 1, wherein the first platen is positioned outside the housing, and wherein the housing includes a middle front housing component, and wherein the middle front housing component is positioned between the pressure component and the first platen.

6. The apparatus of claim 5, wherein the middle front housing component at least partially defines an operating space inside the housing, and wherein the first position of the linkage component and the second position of the linkage component are in the operating space.

7. The apparatus of claim 1, further comprising an emergency stop switch coupled to the housing and configured to generate an emergency signal.

8. The apparatus of claim 7, wherein, in response to the emergency signal, the pressure component stops providing the driving force.

9. The apparatus of claim 8, wherein, in response to the emergency signal, the linkage component is disengaged from the pressure component.

10. The apparatus of claim 8, wherein, in response to the emergency signal, the linkage component is disengaged from the first platen.

11. The apparatus of claim 7, wherein, in response to the emergency signal, the first platen is moved away from the second platen.

12. The apparatus of claim 1, further comprising:
    a protective component positioned adjacent to the first and second platens and configured to prevent a user from reaching the first and second platens during a heat-press process.

13. The apparatus of claim 1, wherein the second platen is positioned below the first platen, and wherein the apparatus further comprises an adjustable supporting component coupled to the second platen and configured to adjust a position of the second platen.

14. A method for manufacturing a heat-press apparatus, the method comprising:
    positioning a pressure component in a housing, the housing defining an operating space, the pressure component being configured to provide a driving force by pressurizing fluid positioned in the pressure component;
    positioning a linkage component in the operating space and coupling the linkage component to the pressure component, the linkage component being movable between a first position and a second position, when the linkage component is at the first position, the linkage component being positioned at a first level, when the linkage component is at the second position, the linkage component being positioned at a second level, the first level being farther relative to the pressure component than the second level;

coupling a first heating component to the linkage component; and positioning a second heating component adjacent to the first heating component;

wherein, when the linkage component is at the second position, the linkage component applies the driving force on the first heating component to hold the first heating component stationary relative to the second heating component;

wherein the heat-press apparatus includes a left safety switch coupled to the housing and configured to be operated by one hand of a user and a right safety switch coupled to the housing and positioned opposite to the left safety switch;

wherein the right safety switch is configured to be operated by the other hand of the user; and wherein, when the left safety switch and the right safety switch are turned on, the pressure component provides the driving force.

15. The method of claim 14, wherein the linkage component is coupled to the pressure component by a first connecting member, and wherein the linkage component is coupled to the first heating component by a second connecting member.

16. The method of claim 15, further comprising:

positioning the first connecting member in a first direction; and positioning the second connecting member in a second direction generally parallel to the first direction.

17. A method for operating a heat-press apparatus, the method comprising:

positioning a linkage component at a first position inside a housing, when the linkage component is at the first position, the linkage component is positioned at a first level; and moving the linkage component to a second position by a driving force provided by a pressure component coupled to the linkage component, the driving force being generated by pressurizing fluid positioned in the pressure component, when the linkage component is at the second position, the linkage component is positioned at a second level, the second level is closer relative to the pressure component than the first level;

wherein, when the linkage component is at the second position, the linkage component applies the driving force on a first heating component coupled to the linkage component so as to hold the first heating component stationary relative to a second heating component positioned adjacent to the first heating component;

wherein the heat-press apparatus includes a left safety switch coupled to the housing and configured to be operated by one hand of a user and a right safety switch coupled to the housing and positioned opposite to the left safety switch;

wherein the right safety switch is configured to be operated by the other hand of the user; and wherein, when the left safety switch and the right safety switch are turned on, the pressure component provides the driving force.

18. The method of claim 17, further comprising:

generating an emergency signal in an event that an emergency stop switch is pressed; and in response to the emergency signal, stopping providing the driving force.

19. The method of claim 18, further comprising:

in response to the emergency signal, disengaging the linkage component from the pressure component.

20. The method of claim 18, further comprising:

in response to the emergency signal, disengaging the linkage component from the first heating component.

* * * * *